United States Patent
Parks (10) Patent No.: US 8,348,198 B2
(45) Date of Patent: Jan. 8, 2013

(54) SAIL WING WITH HIGH SPAN EFFICIENCY AND CONTROLLED PITCHING MOMENT

(75) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 825 days.

(21) Appl. No.: 12/138,900

(22) Filed: Jun. 13, 2008

(65) Prior Publication Data

US 2009/0065651 A1    Mar. 12, 2009

Related U.S. Application Data

(60) Provisional application No. 60/943,832, filed on Jun. 13, 2007.

(51) Int. Cl.
    *B64C 3/10*        (2006.01)
(52) U.S. Cl. ................. 244/198; 244/154; 244/123.1
(58) Field of Classification Search .......... 244/153 R, 244/154, 900–903, 219, 123.11, 123.9, 13, 244/16, 36, 87, 123.1
    See application file for complete search history.

(56) References Cited

U.S. PATENT DOCUMENTS

| | | | |
|---|---|---|---|
| 1,048,835 A | | 12/1912 | Hyde et al. |
| 1,658,006 A | * | 1/1928 | Owens ................ 244/153 R |
| 1,730,249 A | * | 10/1929 | Smith ..................... 244/218 |
| 1,881,034 A | | 10/1932 | Smith et al. |
| D144,067 S | | 3/1946 | Paglia |
| 2,643,076 A | | 6/1953 | Hurel |
| 2,762,590 A | * | 9/1956 | Huie ................... 244/153 R |
| 3,025,027 A | | 3/1962 | Ferreira |
| 3,089,670 A | | 5/1963 | Johnson |
| 3,584,813 A | * | 6/1971 | Sweeney et al. ............ 244/219 |
| 4,262,864 A | | 4/1981 | Eshoo |
| 4,361,295 A | | 11/1982 | Wenzel |
| 4,364,532 A | | 12/1982 | Stark |

(Continued)

OTHER PUBLICATIONS

"A Preliminary Study of Solar Powered Aircraft and Associated Power Trains: NASA Contract Report 3699"; David W. Hall, et al.; Dec. 1983; see pp. 118-124.
"Study of the Aerodynamics of a Small UAV Using AVL Software"; Paul Dorfman; Apr. 24, 2006.

(Continued)

*Primary Examiner* — Timothy D Collins
*Assistant Examiner* — Brian M O'Hara
(74) *Attorney, Agent, or Firm* — Katten Muchin Roseman LLP (57) ABSTRACT

An aircraft comprising a fuselage, a sail wing appended to the fuselage, the sail wing having a sail wing root chord length, and wherein the sail wing includes a sail wing leading edge spar, a sail wing membrane attached to the sail wing leading edge spar, and a sail wing trailing edge wire located at a trailing edge of the sail wing membrane, the aircraft further comprising a wing surface extension, located aft and at an inboard area of the sail wing trailing edge wire, the wing surface extension having a wing surface extension root chord length, and wherein the wing surface extension includes a wing surface extension membrane attached to the sail wing trailing edge wire, and a wing surface extension trailing edge, and wherein the wing surface extension trailing edge is reflexed such that the wing surface extension trailing edge is positioned upwards at a first angle with respect to a plane formed along a centerline of the aircraft and along the lower surfaces of the sail wing. The wing surface extension is further configured to affect a reduced nose-up pitching moment, and to produce a more even coefficient of lift along the wing of the aircraft.

16 Claims, 6 Drawing Sheets

U.S. PATENT DOCUMENTS

| | | |
|---|---|---|
| 4,415,133 A | 11/1983 | Phillips |
| 5,810,284 A | 9/1998 | Hibbs et al. |
| 6,241,195 B1 * | 6/2001 | Wagner, III .................. 244/218 |
| 7,198,225 B2 | 4/2007 | Lisoski et al. |

OTHER PUBLICATIONS

"Gust Load Conditions for Fatigue Tests Based on a Continuous Gust Concept"; J.B. de Jonge, et al., Jan. 13, 1997.

* cited by examiner

SAIL WING WITH HIGH SPAN EFFICIENCY AND CONTROLLED PITCHING MOMENT

PRIORITY

The present application claims priority under 35 U.S.C. §119(e) to U.S. Provisional Patent Application Ser. No. 60/943,832 filed Jun. 13, 2007, the entire contents of which are herein expressly incorporated by reference.

BACKGROUND OF THE INVENTION

1. Field of the Invention

The invention is related to light weight aircraft. More particularly, the invention is related to a system and method for improving wing span efficiency and pitching control moments on lightweight aircraft.

2. Background Art

Sail wings have been proposed for light weight aircraft in the past, and are commonly used on hang gliders. One advantage of sail wings is that they allow a large amount of wing area to be folded up and stowed in a small volume.

However, the flexible membrane of the sail requires significant tension to control its shape, both in camber and twist. Even then, large twist angles can occur along the span, as the sail forms catenary type curves to convert its pressure load into membrane tension. To lower the camber and twist, the tension must be increased. This tension must be reacted by rigid structure, typically the "mast" or leading edge spar, as bending and compression loads. To reduce twist and/or camber, more tension is needed, which means more compression and bending in the spar, which increases the spar mass. Higher tension loads in the sail also require a thicker and heavier sail membrane.

The chordwise catenary curve results in airfoil camber. While this is good for production of lift, it also gives a large nose down pitching moment. The large nose-down pitching moment must either be reacted out by an aft center of gravity, which is unstable, or by a large horizontal tail.

The spanwise curve results in significant twist in the wing, which results in outer half of the wing being very poor at producing lift. Because the outer portion of the wing produces less lift than the inner portion of the wing, additional wing area must be provided to make up for the deficiency. Further still, the non-uniform distribution of lift means that the wing has a lift distribution that produces greater drag due to lift. More wing area means more weight, which can result in less usable load.

Thus, while sail wings are conceptually simple, they tend to have poor performance. Thus, a need exists for a wing configuration for a light weight aircraft that can reduce the induced drag and control the pitching moment.

SUMMARY OF THE INVENTION

It is therefore a general aspect of the invention to provide a wing structure that will obviate or minimize problems of the type previously described.

According to a first aspect of the present invention, an aircraft is provided comprising a fuselage; a sail wing appended to the fuselage, the sail wing having a sail wing root chord length, and wherein the sail wing includes a sail wing leading edge spar (2 in FIG. 1), a sail wing membrane attached to the sail wing leading edge spar, and a sail wing trailing edge wire located at a trailing edge of the sail wing membrane; and a wing surface extension, located aft and at an inboard area of the sail wing trailing edge wire, the wing surface extension having a wing surface extension root chord length, and wherein the wing surface extension includes a wing surface extension membrane attached to the sail wing trailing edge wire, and a wing surface extension trailing edge, and wherein the wing surface extension trailing edge is reflexed such that the wing surface extension trailing edge is positioned upwards at a first angle with respect to a plane formed along a centerline of the aircraft and along the lower surfaces of the sail wing.

According to the first aspect, the wing surface extension root chord length is between about 30% and about 200% of the sail wing root chord length, and the wing surface extension root chord length is about 100% of the sail wing root chord length.

According to the first aspect, the wing surface extension has a semi-span, and the wing surface extension semi-span extends spanwise from a centerline of the aircraft to a distance of about 100% of the sail wing root chord length.

According to the first aspect, the wing surface extension has a semi-span, and the wing surface extension semi-span extends spanwise from a centerline of the aircraft to a distance of about 300% of the sail wing root chord length.

According to the first aspect, the wing surface extension has a full-span, and the wing surface extension full-span extends spanwise for a distance of about 200% of the sail wing root chord length.

According to the first aspect, the wing surface extension has a full-span, and the wing surface extension full-span extends spanwise for a distance of about 600% of the sail wing root chord length. Still further according to the first aspect, the first angle is between about 5 degrees and about 15 degrees, and the first angle is about 10 degrees.

According to the first aspect, the wing surface extension is configured to provide a substantially even coefficient-of-lift distribution over both the wing surface extension and the sail wing, and the wing surface extension is configured to provide a near zero pitching moment at a center of mass of the aircraft.

According to the first aspect, the wing surface extension is configured to provide a net upward pitching moment of a nose of the aircraft about a center of mass of the aircraft, and the wing surface extension is configured to counter a nose-downward pitching moment of a cambered sail wing. Still further according to the first aspect, the aircraft comprises a lightweight aircraft, the aircraft comprises a flying wing aircraft, According to the first aspect, a coefficient of lift distribution of the wing surface extension is configured to affect the aircraft in concert with a coefficient of lift distribution of the sail wing to provide a substantially even coefficient of lift distribution over both the sail wing and the wing surface extension.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

Wing surface extension 20, as shown and described in the accompanying figures, combined with the main sail wing 10 (comprising left main sail wing 10a and right main sail wing 10b), provides a light weight aircraft 50 (light weight aircraft is defined to be less than about 5,000 lbs.) with a high efficiency lifting surface (i.e., high coefficient of lift) and low net pitching moment with only a slight increase in complexity.

Most sail wings have very high taper (small tip chord relative to the root chord). A high degree of taper plus the spanwise twist results in very high lift at the root and very low outboard lift. This is one of the main reasons for high induced drag of the wing.

According to an exemplary embodiment, the wing chord (CH) on the inboard section of light weight aircraft 50 with the wing surface extension 20 is extended even farther, but is reflexed upwards at a specific angle in regard to a plane formed by the lower surfaces of main sail wing (sail wing) 10. According to a further exemplary embodiment, wing surface extension 20 can have a root chord length (CH wing extension) between about 30% to about 200% of the sail wing root chord (CH wing root) length alone. According to a preferred embodiment, wing surface extension 20 can have a root chord length CH wing extension of about 100% of the sail wing root chord length CH wing root. According to an exemplary embodiment, trailing edge 14 of wing surface extension 20 is reflexed upwards at an angle (trailing edge upwards reflexed angle) θ1 that can be between about 5° and about 15°. According to a preferred embodiment, trailing edge upwards reflexed angle θ1 can be about 10°. As shown in FIG. 2, trailing edge upwards reflexed angle θ1 is measured between centerline L-L, which represents a centerline of the fuselage (not shown in FIGS. 1-3) of light weight aircraft 50, and trailing edge wing extension 14 of wing surface extension 20. The centerline L-L is further formed by the centerline of light weight aircraft 50 and a plane formed along the lower surfaces of sail wing 10.

Wing surface extension 20 further includes several other attributes that improve lift of combined sail wing 10 and wing surface extension 20. According to an exemplary embodiment, wing surface extension 20 further includes a semi-span, wherein the semi-span of extends spanwise from a centerline of light weight aircraft 50 to a distance of about 100% of the root chord length of sail wing 10. According to another exemplary embodiment, the semi-span can extend to about 300% of the root chord length of sail wing 10. And still further, wing surface extension 20 further includes the attribute of a full span, wherein the full span of wing surface extension 20 extends spanwise for a distance of about 200% of the root chord length of sail wing 10. According to still another exemplary embodiment, the full span can extend to about 600% of the root chord length of sail wing 10.

As is well known to those of ordinary skill in the art, a structural cable 12 can run along trailing edge 6 of main sail wing 10. Structural cable 12 will normally react to the trailing edge tension loads in membrane 4. According to an exemplary embodiment, structural cable 12 serves to force the root airfoils to be a normal upward cambered part. Reverse cambered wing surface extension 20 is located behind main sail wing 10b at its root. The result, as shown and discussed in greater detail in regard to FIG. 6, infra, is that the net lift at the root is decreased and a strong nose-up pitching moment at the root of sail wing 10 is provided to offset the nose-down moment of the outer portion of sail wing 10. According to an exemplary embodiment, the exact size and reflexed upwards angle $\theta_1$ of the wing surface extension 20 can be manipulated to optimize the performance of light weight aircraft 50. According to several exemplary embodiments, there are many combinations of the size of wing extension 20 and reflexed upwards angle $\theta_1$ that will produce or incur the benefits of a high efficiency lifting surface (i.e., high coefficient of lift) and low net pitching moment with only a slight increase in complexity. As those of ordinary skill in the art can appreciate, a designer of light weight aircraft 50 with combined sail wing 10 and wing extension 20 must manipulate these parameters to best satisfy the design or intended use requirements of light weight aircraft 50. Computer programs exist to aid in this optimization, for example, the AVL Vortex Lattice program that produced the analysis shown in FIGS. 4-6.

According to exemplary embodiment, an approximately even coefficient of lift distribution for the combined sail wing 10 and wing surface extension 20 can be obtained (see FIG. 6), even with large amounts of twist (see twist lines 8a-8e in FIG. 2) in sail wing 10, along with span efficiencies nearly as good as conventional wings. According to an exemplary embodiment, net positive pitching moments can be obtained, thus allowing the construction of a flying wing aircraft. A flying wing aircraft is identified/defined as an aircraft that does not have a separate horizontal surface, either tail or canard, other than the main wing.

Figure 1:
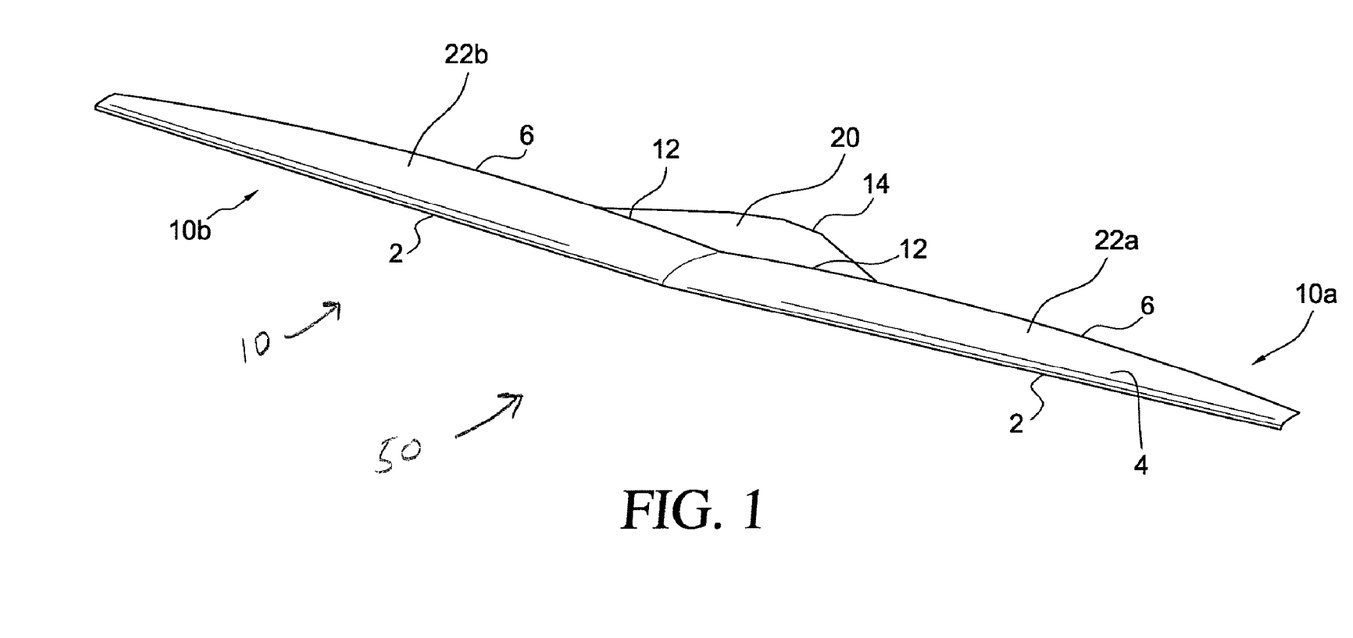
FIG. 1 illustrates a main sail wing with an additional wing surface extension according to an embodiment of the present invention.
Figure 2:
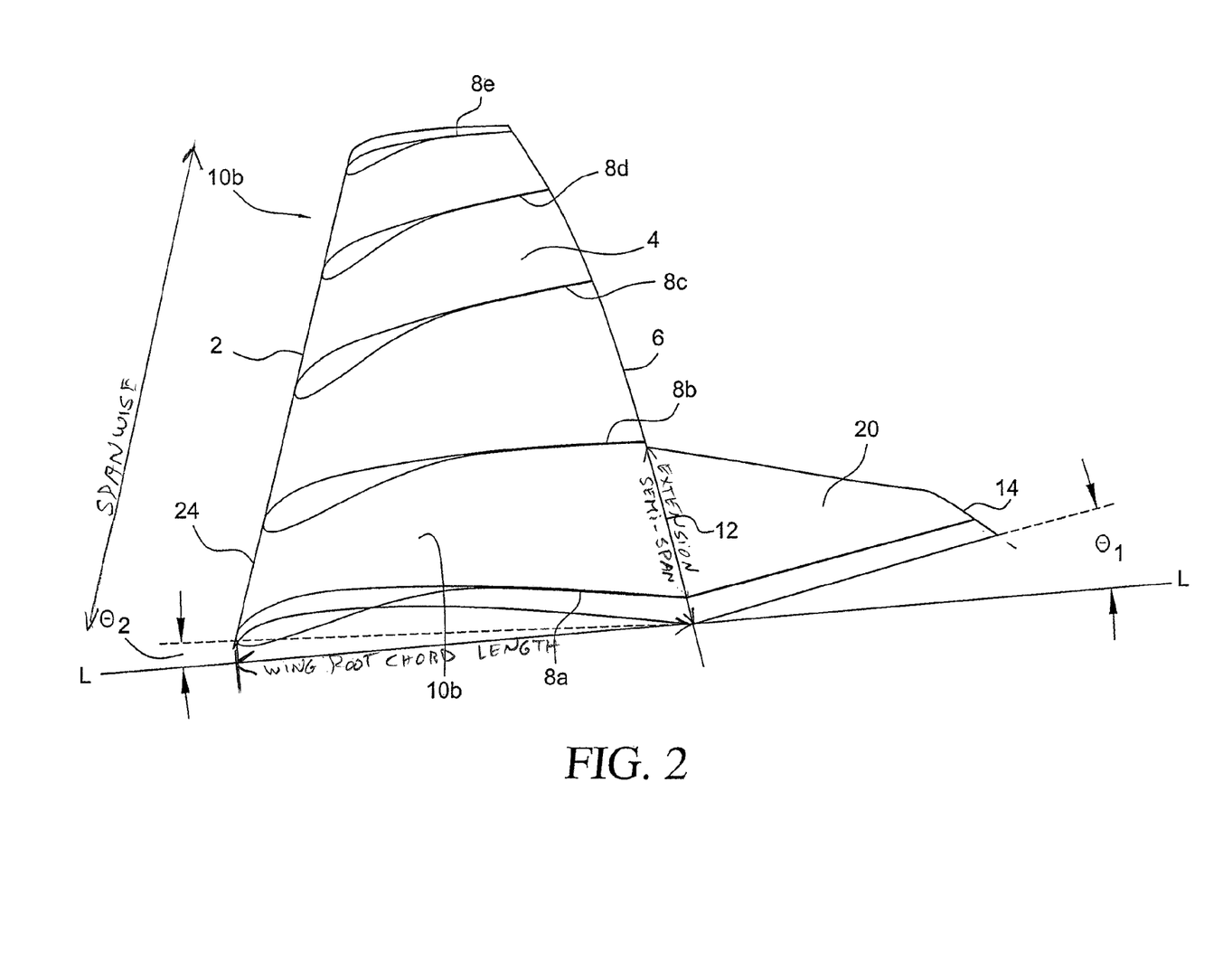
FIG. 2 illustrates a view of the main sail wing with the additional wing surface extension as shown in FIG. 1, as viewed nearly perpendicularly from the fuselage of the aircraft (not shown), with several cross sections illustrating twist and reflex in the main sail wing according to an embodiment of the present invention.
Figure 3:
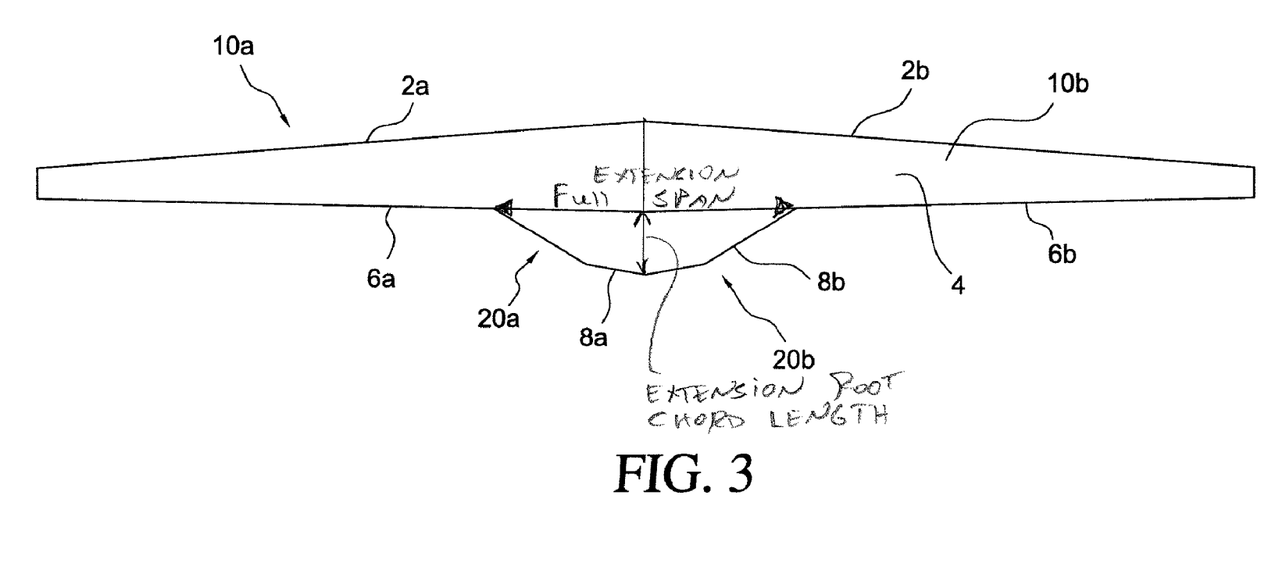
FIG. 3 illustrates a top view of the sail wing and additional wing surface extension as shown in FIG. 1.

FIG. 1 illustrates sail wing 10 with an additional wing surface extension 20 according to an exemplary embodiment. Also shown in FIG. 1 are billows 22a, b in trailing edge 6 of sail wing 10. FIG. 2 illustrates a partial view of sail wing 10 with wing surface extension 20 as shown in FIG. 1, as viewed nearly perpendicularly from the fuselage of the aircraft (not shown). The near end (at the bottom of the page) is the wing root, and only right sail wing 10b is shown. FIG. 3 illustrates a top view of sail wing 10a, b and wing surface extensions 20a, b as shown in FIG. 1 according to an exemplary embodiment.

Figure 4:
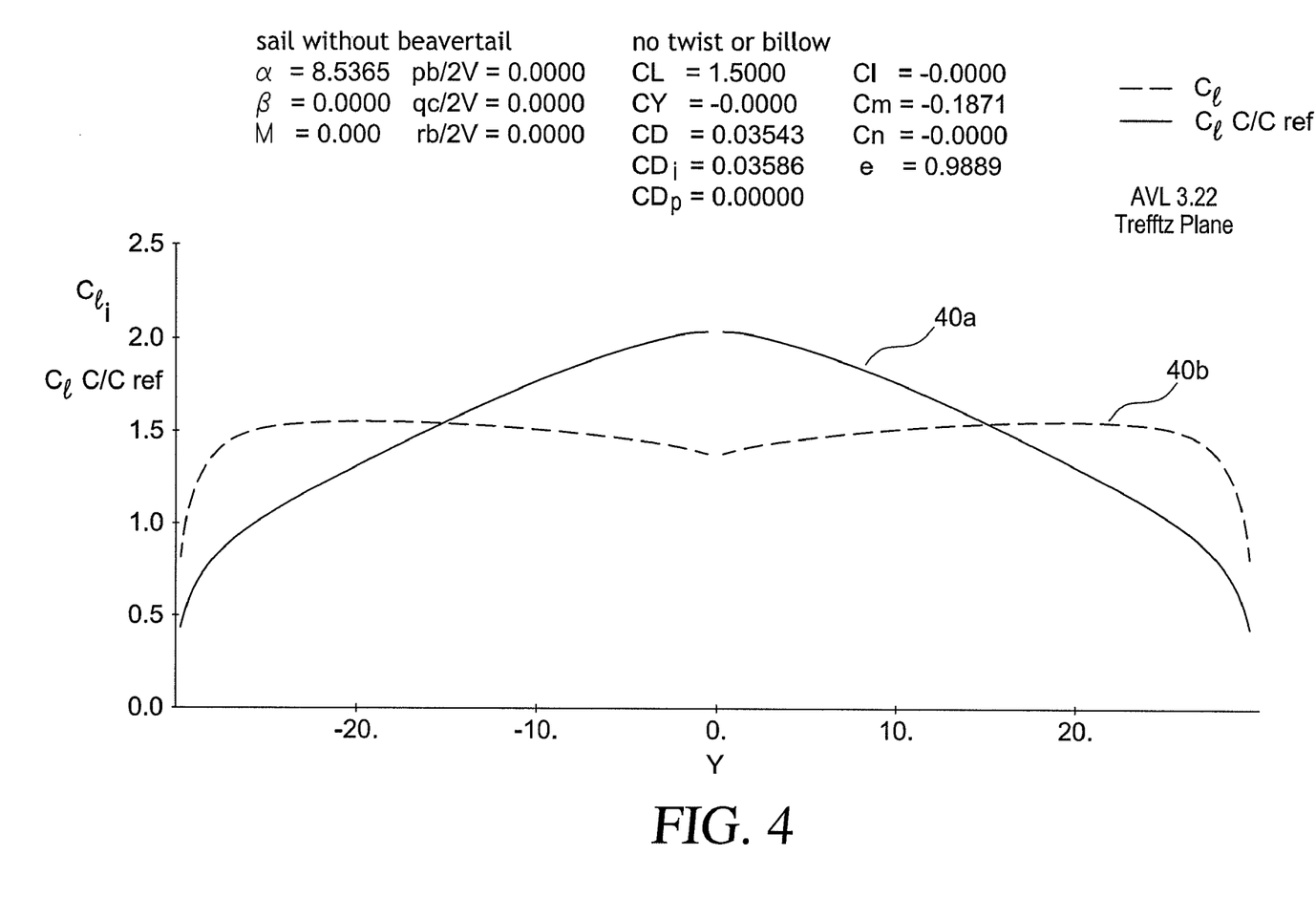
FIG. 4 illustrates a lift distribution diagram of a basic sail wing planform with no twist or billow, and without the additional wing surface extension shown in FIG. 1.

FIG. 4 illustrates a lift distribution diagram (i.e., the amount of lift generated according to location on a wing; "0" is a position at or near the centerline of aircraft 50) of a basic sail wing planform with no twist or billow, and without the additional wing surface extension 20a, b shown in FIGS. 1-3. Lift distribution line 40a is close in shape to an elliptical curve, and the span efficiency (e) is about 98.89%. The pitching moment (Cm), at a value of about −0.1871, is strong and indicates that light weight aircraft 50 will experience a significant nose-down attitude. With such a significant nose-down attitude, a large tail would be required to counteract the nose-down tendencies of light weight aircraft 50. As those of ordinary skill can appreciate, however, it is not possible to maintain this twist distribution in sail wing 10 under normal flight loads. Line 40b (as well as lines 50b, 60b and 60b, discussed below) indicates the local lift coefficient of the airfoils on the wing.

Figure 5:
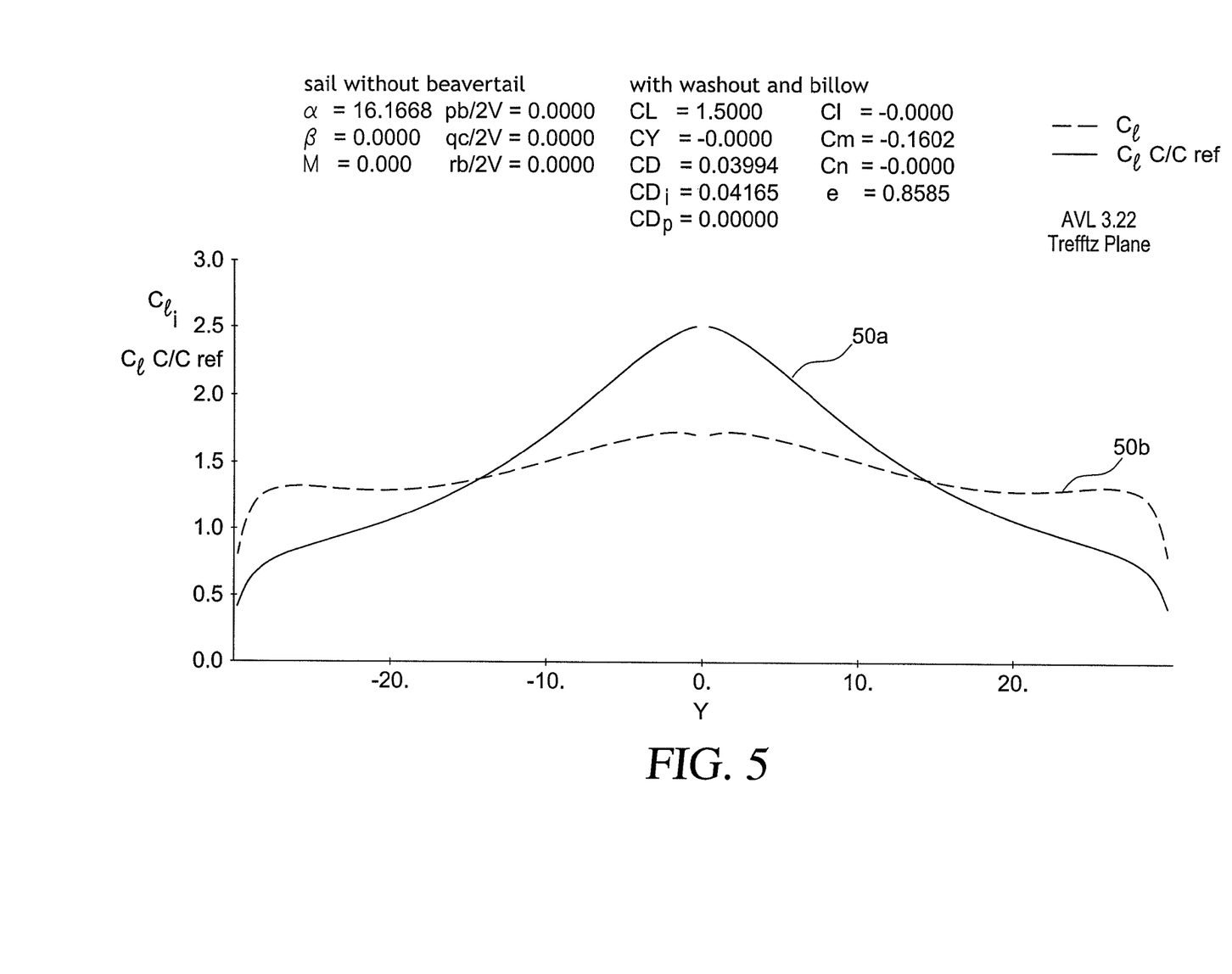
FIG. 5 illustrates a lift distribution diagram of the basic sailwing planform discussed in reference to FIG. 4, but with a twist typical of a sail wing with moderately high trailing edge tension.

FIG. 5 illustrates a lift distribution diagram of the basic sailwing planform discussed in reference to FIG. 4 (i.e., without wing extension 20), but with a twist typical of a sail wing with moderately high trailing edge tension. Span efficiency is now about 85% because lift distribution line 50a is far from the desired elliptical shape. Cm, the pitching moment (−0.1602), still indicates a predisposition for a strongly nose-down attitude (hence also requiring a large tail to counteract the nose-down tendency).

Figure 6:
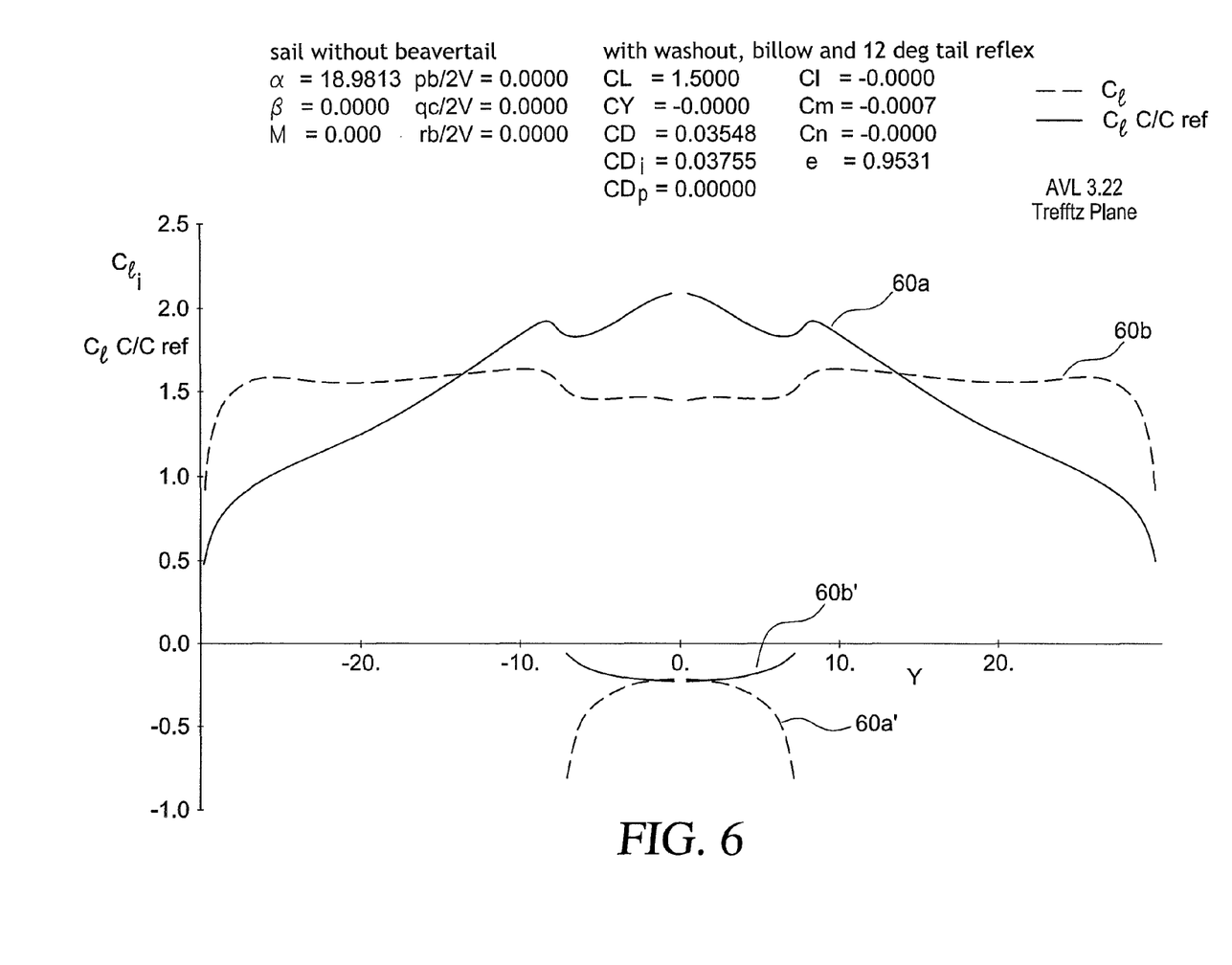
FIG. 6 illustrates a lift distribution diagram with the sail wing and additional wing surface extension as shown in FIG. 1, illustrating that the lift distribution and span efficiency are greatly improved and that the pitching moment is close to zero according to an embodiment of the present invention.

FIG. 6 illustrates a lift distribution diagram with sail wing 10 and additional wing surface extension 20 as shown in FIG. 1, illustrating that the lift distribution and span efficiency are greatly improved, and that the pitching moment Cm is close to zero according to an exemplary embodiment. The twist in sail wing 10 is substantially the same as the wing for which the data was generated in the plot shown in FIG. 5. However, lift distribution line 60a indicates a better span efficiency (e) that is now about 95.31%. Line 60a' is the lift distribution for additional wing surface extension 20, and line 60b' is the coefficient of lift distribution for additional wing surface extension 20. In order to obtain the overall lift distribution for the combined wing structure (sail wing 10 and additional wing surface extension 20), it is necessary to combine lines 60a and 60a'. In addition, the combined wing structure pitching moment is close to zero, meaning that only a small tail would be required to trim light weight aircraft 50 with combined sail wing 10 and additional wing surface extension 20. Further still, the combined wing structure is operating at nearly constant lift coefficient ($C_L$, dashed line: 60b plus 60b'), which means all of the wing area is being used effectively.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. An aircraft comprising:
a sail wing having a sail wing root chord length, and wherein the sail wing includes:
a sail wing leading edge, substantially rigid spar,
a flexible sail wing membrane attached to the sail wing leading edge spar, and
a sail wing trailing edge, substantially non-rigid wire connected to and along a trailing edge of the sail wing membrane, the trailing edge wire being unconnected to any rigid structure of the sail wing beyond a trailing edge root, the sail wing having twist and camber which causes nose-down pitching; and
a wing surface extension, located aft and at an inboard area of the sail wing trailing edge wire, the wing surface extension having a wing surface extension root chord length, and wherein the wing surface extension includes
a wing surface extension membrane attached to the sail wing trailing edge wire, and
a wing surface extension trailing edge, and wherein the wing surface extension trailing edge is reflexed such that the wing surface extension trailing edge is positioned upwards at a first angle with respect to a plane formed along a centerline of the aircraft and along the lower surfaces of the sail wing, the wing surface extension trailing edge upward position reducing the downward pitch caused by the sail wing twist and camber.

2. The aircraft according to claim 1, wherein the wing surface extension root chord length is between about 30% and about 200% of the sail wing root chord length.

3. The aircraft according to claim 1, wherein the wing surface extension root chord length is about 100% of the sail wing root chord length.

4. The aircraft according to claim 1, wherein the wing surface extension has a semi-span, and the wing surface extension semi-span extends spanwise from a centerline of the aircraft to a distance of about 100% of the sail wing root chord length.

5. The aircraft according to claim 1, wherein the wing surface extension has a semi-span, and the wing surface extension semi-span extends spanwise from a centerline of the aircraft to a distance of about 300% of the sail wing root chord length.

6. The aircraft according to claim 1, wherein the wing surface extension has a full-span, and the wing surface extension full-span extends spanwise for a distance of about 200% of the sail wing root chord length.

7. The aircraft according to claim 1, wherein the wing surface extension has a full-span, and the wing surface extension full-span extends spanwise for a distance of about 600% of the sail wing root chord length.

8. The aircraft according to claim 1, wherein the first angle is between about 5 degrees and about 15 degrees.

9. The aircraft according to claim 1, wherein the first angle is about 10 degrees.

10. The aircraft according to claim 1, wherein the wing surface extension is configured to provide a substantially even coefficient-of-lift distribution over both the wing surface extension and the sail wing.

11. The aircraft according to claim 1, wherein the wing surface extension is configured to provide a near zero pitching moment at a center of mass of the aircraft.

12. The aircraft according to claim 1, wherein the wing surface extension is configured to provide a net upward pitching moment of a nose of the aircraft about a center of mass of the aircraft.

13. The aircraft according to claim 1, wherein the wing surface extension is reverse cambered.

14. The aircraft according to claim 1, wherein the aircraft is a lightweight aircraft.

15. The aircraft according to claim 1, wherein the aircraft is a flying wing aircraft.

16. The aircraft according to claim 1, wherein a coefficient of lift distribution of the wing surface extension is configured to affect the aircraft in concert with a coefficient of lift distribution of the sail wing to provide a substantially even coefficient of lift distribution over both the sail wing and the wing surface extension.

* * * * *